United States Patent
Kim et al.

(10) Patent No.: US 7,968,654 B2
(45) Date of Patent: Jun. 28, 2011

(54) MODIFIED CHLORINATED POLYPROPYLENE, ITS PREPARATION METHOD AND ITS BLEND FOR POLYOLEFIN

(75) Inventors: Jong-Hoon Kim, Daejeon (KR); Sang-Jin Lee, Daejeon (KR)

(73) Assignee: Hae Dong Chemical Co., Ltd., Daejeon (KR)

( * ) Notice: Subject to any disclaimer, the term of this patent is extended or adjusted under 35 U.S.C. 154(b) by 881 days.

(21) Appl. No.: 11/794,370

(22) PCT Filed: Dec. 28, 2005

(86) PCT No.: PCT/KR2005/004622
§ 371 (c)(1),
(2), (4) Date: Nov. 28, 2007

(87) PCT Pub. No.: WO2006/071084
PCT Pub. Date: Jul. 6, 2006

(65) Prior Publication Data
US 2008/0119614 A1    May 22, 2008

(30) Foreign Application Priority Data

Dec. 31, 2004 (KR) .......................... 10-2004-0117574
Dec. 27, 2005 (KR) .......................... 10-2005-0130597

(51) Int. Cl.
*C08F 8/32* (2006.01)
*C08F 8/30* (2006.01)

(52) U.S. Cl. .................................. 525/374; 525/330.7
(58) Field of Classification Search .............. 525/330.7, 525/374
See application file for complete search history.

(56) References Cited

U.S. PATENT DOCUMENTS 5,620,747 A * 4/1997 Laura et al. ............... 427/385.5
6,262,160 B1   7/2001 Kawano et al.

FOREIGN PATENT DOCUMENTS

JP            7-26088 A        1/1995

* cited by examiner

*Primary Examiner* — Ling-Siu Choi
(74) *Attorney, Agent, or Firm* — The Webb Law Firm

(57) ABSTRACT

The present invention relates to a blend of polyolefin comprising a modified chlorinated polypropylene. This invention provides a blend of polyolefin comprising a novel amine modified chlorinated polypropylene capable of improving printability by promoting adhesion with ink when the ink is printed or coated on plastic products including film and sheet. The present invention provides a novel blend of polyolefin comprising a modified chlorinated polypropylene, which is prepared by substituting 1-99.9 mole % of chlorine of a chlorinated polypropylene, whose chlorine content is 1-75 wt % and whose number average molecular weight is 100-400,000, with ammonia or an amine compound and is capable of improving dyeability and adhesion performance. This invention also provides the modified chlorinated polypropylene and a method for preparing the same.

9 Claims, No Drawings

US 7,968,654 B2

MODIFIED CHLORINATED POLYPROPYLENE, ITS PREPARATION METHOD AND ITS BLEND FOR POLYOLEFIN

TECHNICAL FIELD

The present invention relates to a modified chlorinated polypropylene, a preparation method thereof and a polyolefin blend, particularly a polypropylene blend, comprising the same. This invention provides a novel blend that can improve printability by promoting adhesion with ink when ink is printed or coated on plastic products, such as films and sheets.

BACKGROUND ART

As a packaging material, plastic film often requires good printability. The printability is determined by the wetting index. Plastic is well known to have a low wetting index. In particular, polypropylene has such a low wetting index that some surface processing, e. g., printing, cannot be achieved. In order to solve the problem and increase the wetting index, corona discharge treatment is generally used. However, the forcibly increased wetting index decreases in length of time.

Films made of conventional polypropylene resins such as propylene homopolymer or propylene-ethylene copolymer and -olefin copolymer have poor printability. Even when the wetting index is increased by corona treatment, it significantly decreases after being left for a long time at high temperature, so that the films cannot be used for printing. The surface tension of a biaxial oriented film and a non-oriented film made of homopolypropylene is in the range of 33-34 dynes/cm and increases to 40-45 dynes/cm after corona treatment for improving the printability. External environments such as heat, especially in the summer season, reduce the surface tension of the film so drastically in length of time that the workability such as printing and deposition deteriorates significantly.

In order to solve the problems, the techniques of blending the polypropylene resin with other resins having polar groups are being developed. However, blends are limited in compatibility and mechanical properties because of difference in basic backbone structures. Also, the graft polymerization techniques for introducing polar groups are being developed, but they are not commercially available and sufficient adhesion performance and printability are not achieved because of intrinsic complexity of the polymerization process and poor graft efficiency of polar monomers.

DISCLOSURE OF THE INVENTION

The present inventors completed the present invention by finding out that a chlorinated polypropylene which is modified with an amine compound offers, when added during the processing of molding products, films and laminates, a wide spectrum of characteristics and improves printability and adhesion performances of various resins.

Thus, it is an object of the present invention to provide a novel modified chlorinated polypropylene which has good compatibility with polyolefin, especially polypropylene, and has polar groups that increase the wetting index and a novel blend thereof with polyolefin, especially polypropylene, for improving dyeability, paintability and adhesion performance.

It is another object of the present invention to provide a simple and easy method for preparing the novel modified chlorinated polypropylene while minimizing side reactions.

It is still another object of the present invention to provide a polyolefin composition with improved printability and dyeability, which comprises the novel modified chlorinated polypropylene.

BEST MODE FOR CARRYING OUT THE INVENTION

The modified chlorinated polypropylene of the present invention is prepared by dissolving chlorinated polypropylene whose chlorine content is 1-75 wt % and whose number average molecular weight is 100-400,000 in a solvent, adding an amine compound to the reaction mass and heating the same to substitute chlorine with the amine compound.

The present invention also provides a method of preparing a modified chlorinated polypropylene substantially without elimination by reacting the chlorinated polypropylene with ammonia or amine in the presence of CaO and MgO.

The present invention also provides an amine modified chlorinated polypropylene and a method of preparing the same comprising the steps of:

preparing a reaction solution by dissolving a chlorinated polypropylene in an organic solvent;

adding an amine derivative to the reaction solution and carrying out reaction by heating the mixture; and adding a base and eliminating unreacted amine compound, residual base and salt and then recovering a modified chlorinated polypropylene from the organic layer.

The addition of CaO or MgO increases the yield of amination and eliminates side reactions, and thus an amine modified product can be obtained more stably, without side reactions and with good substitution yield.

The chlorinated polypropylene used in the present invention has a number average molecular weight in the range from 100 to 400,000 and a chlorine content in the range from 1 to 75 wt %. The reaction of the chlorinated polypropylene with the ammonia or amine compound having at least one primary or secondary amine group produces an amine modified chlorinated polypropylene with 1-99.9 mole % of chlorine substituted with the amine group.

A solvent that can dissolve the chlorinated polypropylene may be used without restriction in the reaction. Preferably, an organic solvent such as toluene, xylene, chlorobenzene, tetrahydrofuran, dimethylformamide, morpholine, dioxane, acetonitrile and methylene chloride is used alone or in combination.

The primary or the secondary amine compound used as modifier in the reaction may or may not have substituents. The structure of an available primary amine is as follows.

(where, A1 is a hydrocarbon having 1 to 18 carbon atoms with a branched, cyclic or aromatic group and includes those having at least one hetero group selected from the group consisting of nitrogen, oxygen and sulfur in the main chain or side chain.)

Examples of the primary amine having said structure are methylamine, ethylamine, propylamine, isopropylamine, butylamine, isobutylamine, t-butylamine, pentylamine, hexylamine, cyclohexylamine, heptylamine, octylamine, isooctylamine, aniline, ethylenediamine, propylenediamine, 1,2-propylenediamine, butylenediamine, hexamethylenediamine, ethanolamine, aminopropanol, aminobutanol, benzidine, 4,4'-diaminobenzanilide, aminobenzene sulfonic acid, diaminobenzene, phenylenediamine, 4,4'-diaminodiphenylmethane, 4,4'-diaminodicyclohexylmethane, 4,4'-diaminodiphenyloxide, 4,4'-diaminodicyclohexylether, 4,4'-diaminodiphenyl-3,3'-diaminodiphenylsulfone, 4,4'-diaminodiphenylsulfide and dimethylaminopropylamine.

The structure of an available secondary amine is as follows.

(where $A_2$ and $A_3$ are hydrocarbons having 1 to 18 carbon atoms with a branched, cyclic or aromatic group and include those having at least one hetero group selected from the group consisting of nitrogen, oxygen and sulfur in the main chain or side chain.)

Typical examples of said compound are dimethyldiamine, diethylamine, dipropylamine, diisopropylamine, dibutylamine, diisobutylamine, di-t-butylamine, dipentylamine, dihexylamine, dicyclohexylamine, diheptylamine, dioxtylamine, diisooxtylamine, diphenylamine, methylaniline, ethylaniline, propylaniline, butylaniline, hydroxyethylaniline, hydroxypropylaniline, methylethanolamine, ethylethanolamine, diethanolamine, dipropanolamine and morpholine.

The following amine compound can also be used as the secondary amine.

(where $A_4$ to $A_7$ are hydrocarbons having 1 to 18 carbon atoms with a branched, cyclic or aromatic group and include those having at least one hetero group selected from the group consisting of nitrogen, oxygen and sulfur in the main chain or side chain and n is a positive integer from 1 to 10.)

Examples of said secondary amine are diethylenetriamine, triethylenetetraamine, tetraethylenepentaamine, pentaethylenehexaamine, polyethyleneimine, dicyandiamide and aminoethylethanolamine.

The temperature of the modification reaction is changeable depending on the solvent and reactivity. Usually the reaction is performed in the range from 30 to 150 C, but it is not particularly limited. The reaction time is changeable depending on the particular amine compound. Usually, the reaction is performed for from 8 to 120 hours. The modification is achieved by dissolving a chlorinated polypropylene (CPP) in a solvent, heating the reaction mass and adding an amine reactant to substitute chlorine with the amine compound.

Depending on the structure of the substituted amine compound, the modified polymer of the present invention can be used for an ultraviolet block agent (when the amine compound offers a shielding effect of the CPP main chain, e.g., t-butylamine), an antioxidant (e.g., 2-hydroxyaniline), an antistatic agent (e.g., ethanolamine), a flame retardant (e.g., diethylenetriamine) and a metal ion sequestering agent.

The present invention provides a method for preparing said modified compound substantially without an elimination process by adding one selected from CaO and MgO to the reaction mixture during the modification. This allows production of the modified compound in high yield substantially without side reactions even when the reaction time is extended. Also, discoloration of the reaction solution due to side reactions can be prevented and the chlorine to amine substitution can be improved by at least 30 mole %.

The modified CPP prepared by the present invention itself can be manufactured into a film, a sheet or a molded product. Also, it can be blended with other resins to improve the properties of the resins. For the resin to be blended, one having good compatibility with CPP, for example, polypropylene, polyethylene, polypropylene copolymer and polyethylene copolymer, is preferred. In general, it is difficult to prepare a modified product having a chlorine substitution ratio of 30 mole % or more. But, the present invention provides a method of preparing a modified product having a chlorine substitution ratio of 40 mole % or more. Thus, if such a product is blended with other resins, dyeability, mechanical strength and other properties can be easily improved even with a small addition amount. If 0.1~30 wt % of the modified chlorinated polypropylene and 99.9~70 wt % of polyolefin are blended, the resultant product has better dyeability, mechanical strength and other properties.

Polypropylene has poor compatibility with other resins and thus is limited in blending to improve dyeability and adhesion performance. However, the modified chlorinated polypropylene of the present invention, which is modified with ammonia or amine, is almost perfectly compatible since it has a structure similar to the backbone of the polymer, and thus it can be blended easily.

If required, such additives as thickener, processing oil, antioxidant, paint, dye, antistatic agent, flame retardant, etc. may be added to the blend of the present invention within the range of common use.

EXAMPLES

Hereinafter, the modification of CPP in accordance with the present invention is described in further detail through examples.

Example 1

5.6 g of CPP (Toyo Kasei 13-LP, elemental analysis result=C, 61.3%; H, 9.6%; Cl, 26%; N, 0%) was dissolved in 100 g of toluene. 20 g of diethylenetriamine (DETA) was added and the mixture was stirred for 6 hours at 50 C. After stirring for 1 hour, a clear and transparent solution was obtained. After 6 hours of reaction, 100 g of a 10% caustic soda solution was added and the mixture was strongly stirred. When all of toluene and part of water were eliminated using a rotary evaporator, a yellow elastic solid was obtained. Unreacted amine compound, residual alkali and salt were removed by washing the elastic solid with 200 g of water for 5 consecutive times. The residual solvent was evaporated with a rotary evaporator and the remainder was dried in vacuum to obtain a solid CPP. The elemental analysis (C, 64.5%; H, 11.0%; N, 6.0%) confirmed that the amine compound was introduced.

100 parts by weight of a composition comprising of 10 wt % of the prepared modified CPP resin and 90 wt % of a polypropylene resin (Hyundai Petrochemical Co. 720) was extruded with a twin screw extruder to obtain a pellet, which was made into a sheet by press molding at 185 C. The prepared sheet was dyed with a Mathis dying machine for 30 minutes at 60 C and then for 20 minutes at 130 C using a 3,000 parts dye solution in dye bath prepared by adding 0.013 wt % (0.013% owf) of a Lumacron Yellow E3G 200% dye, 0.3 wt % (0.3% owf) of a Paianil Red FD-BDY 200% dye and 1.7 wt % (1.7% owf) of a Dianix Blue FBLE 100% dye in distilled water, adjusting the pH to 4-4.5 with glacial acetic acid and adding 0.3 wt % (0.3% owf) of a dispersant (Sunsolt RM-340). Then, the dyed sheet was washed with distilled water at 80 C, reduced for 20 minutes in a bath containing 1 g/L of caustic soda and 2 g/L of sodium hydrosulfide (NaHSO3) at 80 C, washed with water and dried.

The resultant sheet was observed to have a better color tone than expected when compared with the sheet prepared from a polypropylene homopolymer alone or the sheet prepared from an equivalent blend of CPP, instead of the modified CPP of the present invention, and polypropylene, which means that it has an excellent dyeability. Therefore, it was confirmed that the modified chlorinated polypropylene resin prepared by the present invention can improve the dyeability of a polyolefin resin while offering superior compatibility.

Example 2

The procedure of Example 1 was followed, except that ethanolamine was used instead of DETA and a mixture of 80% toluene and 20% acetonitrile was used as solvent. The elemental analysis result (C, 62.7%; H, 10.3%; N, 2.2%) confirmed that the amine compound was introduced. As in Example 1, the sheet prepared from the modified CPP had better dyeability than that prepared from the non-modified CPP.

Example 3

The procedure of Example 1 was followed, except that morpholine was used instead of DETA. The elemental analysis result (C, 64.5%; H, 10.2%; N, 2.6%) confirmed that the amine compound was introduced. As in Example 1, the sheet prepared from the modified CPP had better dyeability than that prepared from the non-modified CPP.

Example 4

The procedure of Example 1 was followed, except that 1-(2-aminoethyl)piperazine was used instead of DETA. The elemental analysis result (C, 62.5%; H, 11.3%; N, 6.0%) confirmed that the amine compound was introduced. As in Example 1, the sheet prepared from the modified CPP had better dyeability than that prepared from the non-modified CPP.

Example 5

4,000 g of morpholine, 500 g of chlorinated polypropylene (Toyo Kasei 13-LP, chlorine content=26%) and 200 g of CaO were added into a 5 L reactor equipped with a mechanical stirrer and reaction was performed for 3 days at 110 C and then for 5 days at 130 C. The extra morpholine was evaporated with a rotary evaporator and the residual was dissolved in 4,000 g of methylene chloride and filtered with a bag filter having a pore size of 1 m. The filtrate was evaporated, concentrated and dried in vacuum to obtain the product. The elemental analysis confirmed that a modified product in which 63.9 mole % of chlorine was substituted with morpholine was obtained.

2 parts by weight of the prepared polymer and 98 parts by weight of polypropylene (Hyundai Petrochemical Co., 7620) were extruded in a single screw extruder (Sewon M-Tech) with 4 zones, whose temperature was adjusted to 210 C, 220 C, 220 C and 210 C, respectively, to prepare a pellet. The pellet was introduced into a hopper of a melt spinner. The pellet was spun into a multifilament consisting of 90 yarns and processed into a thickness of 900 deniers. The temperature of the spinner was maintained in the range from 210 to 230 C. And, the pressure of the spinner was maintained constantly at 210 kg/cm$^2$ using a gear pump to obtain uniform extrusion during melt spinning. The melt spun fiber was cooled at room temperature.

Example 6

4,000 g of morpholine, 500 g of chlorinated polypropylene (Toyo Kasei 16-LP, chlorine content=32%) and 200 g of MgO were added into a 5 L reactor equipped with a mechanical stirrer and reaction was performed for 3 days at 110 C and then for 5 days at 130 C. The extra morpholine was evaporated with a rotary evaporator and the residual was dissolved in 4,000 g of methylene chloride and filtered with a bag filter having a pore size of 1 m. The filtrate was evaporated, concentrated and dried in vacuum to obtain the product. The elemental analysis confirmed that a modified product in which 71.4 mole % of chlorine was substituted with morpholine was obtained. Fiber was prepared by spinning in the same manner as in Example 5.

Comparative Example 1

Fiber was prepared by spinning in the same manner as in Example 5, except that polypropylene (Hyundai Petrochemical Co., 7620) was spun without a pellet preparation process.

Dyeability Test for Fibers of Example 5, Example 6 and Comparative Example 1

(Dyeability Test Using Disperse Dye)

100 parts dye solution in dye bath was prepared by adding 1.1 wt % (1.1% owf) of a Lumacron Yellow ERD 100% dye, 3.4 wt % (3.4% owf) of a Lumacron Red F3BS 100% dye and 0.03 wt % (0.03% owf) of a Dianix Blue ACE 100% dye in distilled water, adjusting the pH to 4-4.5 with glacial acetic acid and adding 0.3 wt % (0.3% owf) of a dispersant (Sunsolt RM-340). The fibers prepared in Example 5, Example 6 and Comparative Example 1 were washed with distilled water, immersed in the dye bath, heated in a Mathis dying machine over a 36-minute period from 40 C to 130 C, dyed for 40 minutes at 130 C and washed with distilled water at 80 C. The dyed fibers were reduced for 20 minutes in a bath containing 1 g/L of caustic soda and 2 g/L of sodium hydrosulfide (NaHSO3) at 80 C, washed with water and dried. When observed with naked eyes, the fibers of Example 5 and Example 6 were dyed much better than that of Comparative Example 1.

(Dyeability Test Using Acid Dye)

100 parts of dye solution in dye bath was prepared by adding 0.63 wt % of a Nylosan Yellow N-3RL dye, 3.3 wt % of a Nylosan Red N-2RBL dye and 0.02 wt % of Telon Blue AFN dye in distilled water and then adding 3 g/L of ammonium sulfate $(NH_4)_2SO_4$) and 1.00 part of a leveling agent (NEWBON MG).

The fibers prepared in Example 5, Example 6 and Comparative Example 1 were washed with distilled water, immersed in the dye bath, heated in a Mathis dying machine over a 44-minute period from 40 C to 105 C, dyed for 30 minutes at 105 C and washed with distilled water at 80 C. The dyed fibers were reduced for 20 minutes in a bath containing 1 g/L of caustic soda and 2 g/L of sodium hydrosulfide (NaHSO$_3$) at 80 C, washed with water and dried. When observed with naked eyes, the fibers of Example 5 and Example 6 were dyed much better than that of Comparative Example 1.

As apparent from the above description, the modification method of the preset invention enables simple and effective preparation of a modified CPP in which chlorine is substituted with an amine compound. The resultant modified CPP has superior compatibility with polypropylene during blending and remarkably improved dyeability and printability. Using a variety of amine compounds offering different functions such as ultraviolet block, antistaticity and antioxidation, it can be utilized as diverse additives for polymers.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A polyolefin composition comprising 0.1-30 wt % of a modified chlorinated polypropylene, which is prepared by substituting 1-99.9 mole % of chlorine of a chlorinated polypropylene whose chlorine content is 1-75 wt % and whose number average molecular weight is 100-400,000 with ammonia or an amine compound, and 99.9-70 wt % of polyolefin.

2. The composition of claim 1, wherein 30-99.9 mole % of chlorine of said modified chlorinated polypropylene is substituted with ammonia or an amine compound.

3. The composition of claim 1, wherein said amine compound is a primary or secondary amine compound.

4. The composition of claim 1, wherein said polyolefin comprises at least one selected from the group consisting of polypropylene, polyethylene, polypropylene copolymer and polyethylene copolymer.

5. The composition of claim 1, wherein said polyolefin is polypropylene.

6. A method for preparing a modified chlorinated polypropylene, which comprises the steps of:
dissolving a chlorinated polypropylene in an organic solvent in a reactor to form a reaction mass and mixing the reaction mass with at least one selected from the group consisting of ammonia, a primary amine and a secondary amine;
heating the reactor, so that the chlorinated polypropylene reacts with the ammonia, primary amine or secondary amine; and
adding a base, eliminating unreacted ammonia, primary amine or secondary amine, residual base and salt and recovering a modified chlorinated polypropylene from the organic layer of the solvent, wherein the modified chlorinated polypropylene is prepared by substituting 1-99.9 mole % of chlorine of the chlorinated polypropylene whose chlorine content is 1-75 wt % and whose number average molecular weight is 100-400,000 with the ammonia, primary amine or secondary amine.

7. The method of claim 6, wherein MgO and CaO are further added in the mixing step.

8. A method for preparing a modified chlorinated polypropylene, which comprises the steps of:
dissolving a chlorinated polypropylene in an organic solvent in a reactor to form a reaction mass and mixing the reaction mass with at least one selected from the group consisting of ammonia, a primary amine and a secondary amine;
heating the reactor, so that the chlorinated polypropylene reacts with the ammonia, primary amine or secondary amine; and
adding a base, eliminating unreacted ammonia, primary amine or secondary amine, residual base and salt and recovering a modified chlorinated polypropylene from the organic layer of the solvent, wherein the modified chlorinated polypropylene is prepared by substituting 30-99.9 mole % of chlorine of the chlorinated polypropylene whose chlorine content is 1-75 wt % and whose number average molecular weight is 100-400,000 with the ammonia, primary amine or secondary amine.

9. A method for preparing a modified chlorinated polypropylene, which comprises the steps of:
dissolving a chlorinated polypropylene in an organic solvent in a reactor to form a reaction mass and mixing the reaction mass with at least one selected from the group consisting of a primary amine and a secondary amine;
heating the reactor, so that the chlorinated polypropylene reacts with the primary amine or secondary amine; and
adding a base, eliminating unreacted primary amine or secondary amine, residual base and salt and recovering a modified chlorinated polypropylene from the organic layer of the solvent, wherein the modified chlorinated polypropylene is prepared by substituting 1-99.9 mole % of chlorine of the chlorinated polypropylene whose chlorine content is 1-75 wt % and whose number average molecular weight is 100-400,000 with the primary amine or secondary amine.

* * * * *